United States Patent Office 3,830,769
Patented Aug. 20, 1974

---

3,830,769
FIRE RETARDANT POLYMERS
Dilip K. Ray-Chaudhuri, Somerville, Carmine P. Iovine, Somerset, and Albert I. Goldberg, Summit, N.J., assignors to National Starch and Chemical Corporation, New York, N.Y.
No Drawing. Filed May 30, 1972, Ser. No. 257,772
Int. Cl. C08f 1/13, 37/00
U.S. Cl. 260—29.6 R     6 Claims

ABSTRACT OF THE DISCLOSURE

Fire retardant polymers containing moieties derived from (1) brominated phosphate monomers and (2) halogenated ethylenically unsaturated monomers, and an improved method for preparing such polymers which comprises reducing the acid value of the bromine phosphate monomer prior to heating said brominated phosphate monomer together with said halogenated ethylenically unsaturated monomer in the presence of a free radical initiator.

---

This invention relates to novel copolymers which impart retardancy to a wide variety of substrates, and to an improved process for preparing such fire retardant polymers.

The use of phosphorus and halogen containing monomers to impart fire retardant properties to polymers is well known to those skilled in the art. In characterizing the fire retardancy of such monomers, a convenient notation known as "Fire Retardant Index" may be utilized. The index of any particular material is calculated on a weight basis utilizing the following equation.

$$FRI = 10(P\%) + 2(Br\%) + (Cl\%) + 2(N\%)$$

For example, a compound containing a 5%, by weight, phosphorus content and a 50%, by weight, bromine content would exhibit an FRI of 150. It has been determined that for numerous industrial applications, an FRI of at least about 60 is required to impart satisfactory fire retardance. FRI values of at least about 80 are generally required for saturating or binding cellulosic substrates.

However, numerous difficulties have been encountered in preparing effective and economical phosphate-containing vinyl monomers and in polymerizing such monomers by means of conventional emulsion polymerization techniques. The primary difficulty relates to the limited hydrolytic stability exhibited by the prior art phosphate-containing monomers. This instability is exhibited during polymerization where the fire retardant phosphate functional groups are hydrolyzed to non-fire retardant phosphoric acid moieties. This hydrolytic instability is also encountered in the subsequent utilization of the polymers to treat substrates as evidenced by the fact that the fire retardant groups are either readily leached out of the substrate or converted on the substrate to non-fire retardant alkaline earth phosphate salts during wet laundering.

It is also to be noted that the use of the prior art phosphate-containing monomers in vinyl polymerizations, and particularly in emulsion polymerizations, results in poor monomer conversion and low molecular weight polymers.

In order to overcome such difficulties, practitioners in the art have suggested the use of phosphonates, such as bis-chloroethyl vinyl phosphonate as substitutes for the phosphates. While such phosphonates exhibit greater hydrolytic stability, they are also more difficult to copolymerize at high monomer conversions into high molecular weight vinylpolymers by means of emulsion techniques. As a result of these shortcomings and at the high concentrations required for fire retardancy, it is difficult to utilize these phosphonates in the preparation of emulsion polymers which exhibit effective binding power to the treated substrates.

It is the prime object of this invention to provide phosphate-containing monomers for use in the preparation of fire retardant polymers.

It is a further object to provide phosphate-containing monomers which exhibit improved hydrolytic stability and which readily participate in vinyl emulsion polymerization reactions.

It is still a further object to provide an improved polymerization process which results in the preparation of high molecular weight fire retardant polymers at high monomer conversion.

It is another object to utilize the resulting polymers to treat a wide variety of substrates so as to impart to the substrates a high degree of permanent fire retardancy.

Various other objects and advantages of this invention will become apparent from a reading of the disclosure which follows hereinafter.

We have now discovered that the use of certain brominated phosphate monomers, as hereinafter described, in the preparation of fire retardant polymers overcomes the difficulties inherent in the comparable use of prior art phosphate-containing monomers. Thus, the specified phosphate monomers have been found to exhibit a high degree of hydrolytic stability during the polymerization procedure as well as when they are present on treated substrates as part of a fire retardant polymer.

We have also determined that these monomers can be made to readily participate in vinyl emulsion polymerization techniques so as to yield high molecular weight polymers at high monomer conversions by significantly reducing the acidity and the impurity content of the phosphate-containing monomers.

The polymers prepared from such phosphate monomers are highly resistant to burning and when utilized to treat various substrates impart durable fire retardancy thereto. Thus among the primary advantages derived from the use of these polymers are (1) the applicability of these additives to a wide variety of substrates, e.g. textiles, paper and the like; (2) the prolonged retention of the fire retardant properties imparted by these novel polymers despite repeated wet laundering and/or dry cleaning; (3) the ease with which substrates may be treated with these additives; (4) the enhanced wet and dry tensile strength which is also imparted to the treated substrates; (5) the ability to treat substrates without effecting any loss or reduction in the mechanical and aesthetic characteristics of the treated substrates; and (6) the ability to effectively apply these additives in aqueous systems, thereby avoiding the flammability, solvent odor and solvent volatility encountered with the use of lacquer or organic solvent systems.

The flame retardant polymers of this invention contain moieties derived from (1) at least one brominated phosphate monomer and (2) at least one halogenated ethylenically unsaturated monomer.

The applicable brominated phosphate monomers correspond to the formula

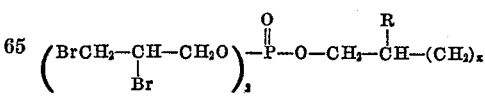

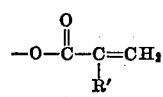

wherein:

R is selected from the group consisting of hydrogen and chlorine atoms and methyl radicals;

$x$ is 0 when R=H, CH$_3$;

$x$ is 1 when R=Cl; and

R' is selected from the group consisting of hydrogen atoms and methyl radicals.

Specific examples of such monomers are bis-dibromopropyl acryloxyethyl phosphate, bis-dibromopropyl acryloxypropyl phosphate, bis-dibromopropyl methacryloxyethyl phosphate, bis-dibromopropyl methacryloxypropyl phosphate, bis-(2,3-dibromopropyl)-3-acryloxy-2-chloropropyl phosphate and bis-(2,3-dibromopropyl)-3-methacryloxy-2-chloropropyl phosphate. General processes which are applicable for preparing the brominated phosphate monomers are disclosed in U.S. Pat. 2,791,574, issued May 7, 1957, and British Pat. 877,905, issued Sept. 20, 1961. It should be noted, however, that the presence of a monoalkyl dichlorophosphate component in the reactant system results in the preparation of the specified phosphate monomers which contain significant amounts of diacrylate or dimethacrylate impurities therein. The presence of such contaminants severely restricts the quantity of phosphate-containing monomer that can be advantageously copolymerized. Thus, in solution polymization the impurities limit the molecular weight of the polymer that can be attained before gellation results. In emulsion polymerization, the impurities interfere with the stability of the latex and tend to promote grit formation. Accordingly it is preferred, for purposes of this invention, that the applicable brominated phosphate monomers contain less than about 1%, by weight, of such diacrylate or dimethacrylate impurities. Reduction of the impurity content to the preferred level of less than about 1.0%, by weight, may be achieved by modifying the reactant system to eliminate the polyfunctional reactants. For example, conventional purification of the hydroxyalkyl acrylate or methacrylate reactant can be utilized to remove undesirable bis-acrylates and bis-methacrylates, while purification of the bis-dialkyl chlorophosphate component will serve to remove the undesirable monoalkyl dichlorophosphates.

It should also be noted that as a result of the preparative technique utilized to prepare the brominated-phosphate monomers, there is an increase in the acidity exhibited by the monomers. The presence of such high acid values is also undesirable inasmuch as it tends to interfere with the beneficial characteristics exhibited by the monomer. Such adverse effects are particularly noted in emulsion polymerization systems wherein the high acidity significantly reduces the monomer conversion rate. In order to reduce the acidity of these monomers to an acceptable level, as defined by an Acid Number of less than about 3, and preferably less than about 1, the monomer can be treated with an acid scavenger such as ethylene oxide or propylene oxide. The neutralization reaction which is exothermic, is continued for a period of time sufficient to reduce the acid number to the desired level. Upon removal of the residual acid scavenger, the monomer can be utilized in the polymerization technique without further purification.

The following monomers are representative of the applicable halogenated ethylenically unsaturated monomers which are copolymerized with said brominated phosphate monomers: vinyl halides such as vinyl chloride and vinyl bromide; vinylidene halides such as vinylidene chloride and vinylidene bromide; halogenated styrene monomers such as chlorostyrene, bromostyrene, and chloromethylstyrene; halogen-substituted alkyl esters of acrylic and methacrylic acids such as 2,3-dibromopropyl acrylate and methacrylate; and, mono-substituted halogenated alkyl esters of maleic and fumaric acids such as mono-2,3-dibromopropyl maleate and the corresponding fumarate. It is to be noted that as a result of the presence of the halogen substituents and the corresponding increase in FRI, these comonomers also contribute to the fire retardancy of the resulting copolymers.

In order to provide polymers which will efficiently function as fire retardant additives, it is desirable that the polymer contain from about 10 to 95%, and preferably from about 15 to 70%, of the brominated phosphate monomer, and from about 5 to 75%, and preferably from 15 to 70%, of the halogenated ethylenically unsaturated monomer; these percentages being based on the total weight of the polymer.

In order to modify certain properties of the fire retardant polymers, the practitioner may utilize other copolymerizable monomers in the preparation thereof. Among these optional monomers are alkyl esters of acrylic and methacrylic acid such as methyl acrylate, methyl methacrylate, ethyl acrylate and butyl acrylate; amides of acrylic and methacrylic acid and N-alkanol derivatives thereof such as acrylamide and N-methylol acrylamide; alpha, beta-unsaturated carboxylic acids such as acrylic, methacrylic, crotonic, fumaric, maleic and itaconic acids; vinyl esters such as vinyl acetate and vinyl propionate; mono- and dialkyl esters of maleic and fumaric acids such as mono- and diethyl maleates, mono- and dibutyl maleates, as well as the corresponding fumarates; vinyl ethers such as methyl vinyl ether; and vinyl nitriles such as acrylonitrile.

These optional monomers may be present in the polymer in concentrations ranging from 0 to 40%, by weight of the resultant polymer. It should be noted that in order to function as effective fire retardant additives, the novel polymers of this invention should contain at least about 10%, by weight, of moieties derived from the brominated phosphate monomer so that the FRI of the polymer will be at least about 60 and preferably in the range of about 60–110.

The preferred method for preparing the copolymrs of this invention is in latex, i.e. emulsion, form by means of any of the aqueous emulsion polymerization techniques well known to those skilled in the art. The latex form is preferred inasmuch as it enhances performance and application possibilities, it utilizes water rather than organic solvent and it is economical. The emulsion techniques generally involve the reaction of an aqueous emulsion of the respective monomers in the presence of a free radical type catalyst such as a peroxide, persulphate or azo catalyst. The reaction is usually conducted under agitation at temperatures in the range of from about 30 to 80° C. For purposes of this invention, these emulsion copolymers may contain a total solids content ranging from about 25 to 60%, by weight, as desired by the practitioner. While it is preferred to prepare these polymers in latex form, it should be noted that they may also be readily prepared by means of a free radical initiated process utilizing bulk, suspension or solution polymerization techniques. Correspondingly, the polymers may, if desired, be converted into relatively large particles known as beads or pearls by dispersing the solution polymerized polymer in water, driving off the solvent and then separating and drying the particles.

The novel polymers of this invention may be effectively utilized to treat a virtually unlimited variety of solid materials regardless of whether they exhibit fibrous or porous surfaces or structures. Among such material are textiles derived from wool, cotton, polyester, nylon, polyacrylonitrile and other synthetic fibers; paper, paperboard, nonwoven fabrics, leather, fur, and the like. For purposes of convenience, when reference is hereinafter made to "applying to" or to "treating" or to the "treatment" of such substrates, the latter terms are meant to encompass the coating and/or impregnation of the applicable substrates.

The latter substrates may be treated by means of any effective technique whose use is desired by the practitioner. Thus, textiles and paper are typically treated by a "padding" technique wherein the substrate is passed through the aqueous emulsion or organic solution or dispersion of the polymer, squeezed through a nip and then briefly heated to evaporate the solvent. Depending on the monomeric components of the polymer, the treated substrate may be subsequently cured by being heated at a temperature of from about 60 to 150° C. for a period of about 5 to 10 minutes, thereby developing maximum physical properties. Paper and paperboard products may also be treated by means of any conventional surface sizing technique such as size press, tub and calendar-stack techniques. In addition, such conventional coating techniques as spraying and brushing may also be utilized in order to deposit a film of the polymer on the surface of the substrate. The amount of additive which is required to provide adequate fire retardancy will vary according to the particular polymer being used, the selected substrate, and the specific end use application of the resulting treated product. In general, however, a polymer pick-up of at least about 30%, by weight of the substrate, will provide adequate fire retardancy.

The following examples will further illustrate the embodiment of this invention. In these examples all parts given are by weight unless otherwise noted.

EXAMPLE I

This example illustrates the preparation of a typical polymer of this invention by means of an emulsion polymerization technique.

Prior to initiating the polymerization reaction, it was determined that the bis-dibromopropyl acryloxyethyl phosphate to be utilized therein exhibited an acid number of 40. Accordingly, ethylene oxide was bubbled through the phosphate monomer resulting in an exothermic neutralization reaction. Neutralization was continued for a period of time sufficient to reduce the acid number to 0.80. Residual ethylene oxide was thereafter removed.

The following component blends were utilized in preparing the polymer of this example.

Blend 1:                                           Parts
  Water ............................................ 440.0
  Sodium bisulfite .................................. 1.8
  Blend 2 ........................................... 35.4
  Blend 3 ........................................... 61.6
  Ammonium persulfate ............................... 0.50
Blend 2:
  Water ............................................. 15.2
  Fumaric acid ...................................... 1.86
  Sodium hydroxide .................................. 1.06
  A 60%, by weight, aqueous solution of N-methylol acrylamide ................................. 10.0
  A 20%, by weight, aqueous solution of dodecylbenzene sodium sulfonate (surfactant) ...... 85.0
  A 30%, by weight, aqueous solution of amidosulfosuccinate (surfactant) ................. 42.6
  Ammonium persulfate ............................... 1.3
Blend 3:
  Vinylidene chloride ............................... 432.0
  Bis-dibromopropyl acryloxyethyl phosphate (Acid No. 0.80) ............................... 106.8
  Butyl acrylate .................................... 78.0

A reaction vessel fitted with a condenser, addition funnels, and means for mechanical agitation was charged with Blend 1. The initial charge was then heated until gentle reflux was obtained at 41° C. Thereafter, Blends 2 and 3 were uniformly added to the reaction vessel over a period of three hours. Heating was continued for an additional hour whereupon the system was cooled and the desired polymer recovered.

The resulting latex polymer had a viscosity of 16.5 centipoises, a solids content of 45.2%, a pH level of 3.0 and an average particle size of 0.12 microns. A film which was formed from the polymer was shown to be flexible, tough and nonflammable. The FRI of the polymer was calculated to be 76.5.

EXAMPLE II

A number of different fire retardant polymers were prepared according to the general procedure set forth in Example I hereinabove, utilizing a variety of monomers at different concentration levels. In each instance, the brominated phosphate monomer was reacted with an acid scavenger such as ethylene or propylene oxide to reduce its acidity. The primary reactants and the concentrations in which they were used to prepare the respective polymers are presented in the following table:

| Polymer number | 1 | 2 | 3 | 4 | 5 | 6 | 7 |
|---|---|---|---|---|---|---|---|
| Parts: | | | | | | | |
| Vinyl chloride | 58.5 | 57.2 | 200 | 58 | 71.5 | 72 | |
| Vinylidine chloride | | | | | | | 55 |
| Bis-dibromopropyl acryloxyethyl phosphate (Acid No. 0.80) | 41.5 | 12.0 | | 30 | | 15 | 25 |
| Bis-dibromopropyl acryloxypropyl phosphate (Acid No. 0.30) | | | 210 | | | | |
| Bis-dibromopropyl methacryloxyethyl phosphate (Acid No. 0.40) | | | | | 15.0 | | |
| Butyl acrylate | | 10.3 | 200 | 12 | | 13 | |
| Ethyl acrylate | | | | | 13.5 | | 20 |
| Tris-dibromopropyl phosphate (fire retardant plasticizer) | | 19.9 | | | | 25 | |
| N-methylol acrylamide | | | | | | 1.0 | |
| Solids content, percent by weight | 44.8 | 45.8 | 45.4 | 47.7 | 58.2 | 45.6 | |
| pH level of final emulsion | 5.7 | 2.9 | 2.9 | 3.5 | 3.9 | 3.0 | |
| Percent monomer conversion | 95 | 94 | 96 | 97 | 98 | 94 | |
| Calculated FRI | 107.5 | 97 | 76 | 89 | 75.5 | 97.4 | 71.1 |

Each of the polymers described hereinabove was readily prepared by the specified emulsion polymerization technique. In each instance, the film that was deposited from each of the polymers was flexible, tough and nonflammable.

Additional polymers may be prepared in a like manner by utilizing any combination of the brominated phosphate monomers, halogenated ethylenically unsaturated monomers and optional monomers specified hereinabove.

EXAMPLE III

This example illustrates the desirability for adhering to the prescribed brominated phosphate monomer limitations in preparing effective fire retardant polymers.

Part A: The procedure of Example I hereinabove was identically repeated with the exception that the specified brominated phosphate monomer was replaced by bis-beta-chloroethyl vinyl phosphonate. The difficulty in preparing an effective emulsion polymer utilizing the phosphate monomer was evidenced by the formation during the reaction of a substantial amount of grit and by the appearance of instability in the latex after only about two and one-half hours of the polymerization reaction had elapsed.

Part B: The procedure utilized to prepare polymer II-4 was repeated in an identical manner with the exception that the brominated phosphate monomer was prepared from an impure intermediate. The resulting monomer thus exhibited an acceptable acidity, Acid Number 0.80, but an unacceptable diacrylate content of greater than 1% by weight. It was observed that an effective polymer could not be prepared with the impure monomer inasmuch as the latex coagulated and dropped out of the system after the completion of only about two hours of the polymerization procedure.

Part C: Example I was once again repeated with the exception that the acid number of the specified brominated phosphate monomer was not reduced but rather was allowed to remain at a value of 40. The ineffectiveness of this approach was clearly evident in the resulting polymer which exhibited a solids content of only 30.7%, by weight, and a corresponding monomer conversion of only about 60%.

The data presented hereinabove clearly indicates the desirability of utilizing the brominated phosphate monomers specified herein as well as for adhering to the prescribed maximum impurity and acidity levels.

EXAMPLE IV

This example illustrates the excellent fire retardant properties exhibited by substrates which have been treated with the novel polymers of this invention.

In order to demonstrate the excellent fire retardant characteristics of the novel polymers of this invention the following testing procedure was employed. Thus, a sample of a 58 pound per ream paper was saturated with the polymer sample, squeezed through a nip and heated at a low temperature in order to evaporate the solvent. The treated paper was then submitted to a standard vertical burn flammability test ASTM D777–46. In this procedure, the treated substrate is placed in a vertical position and a flame applied to the edge thereof for a period of 12 seconds. Upon removal of the flame, observations are made as to the time required for the substrate to self-extinguish, the length of time in which the substrate exhibits an afterglow, and the length of the char formation. Thereafter, duplicate samples are soaked in water for a period of two hours, dried and then resubmitted to the vertical burn flammability test.

The results of these determinations for the initial samples are presented in Table I, while the results for the water extracted samples are presented in Table II.

TABLE I

| Polymer number | Percent pickup, by weight of substrate | Time to self-extinguish (seconds) | After-glow (seconds) | Char length (inches) |
|---|---|---|---|---|
| Control | Total conflagration | | | |
| II-1 | 76.6 | 0 | | 3.4 |
| II-1 | 37.0 | 0 | 5.3 | 4.5 |
| II-5 | 92.2 | 0 | 6.4 | 3.75 |
|  | 90.5 | 0 | 5.4 | 3.81 |
|  | 63.3 | 0 | 7.3 | 4.35 |

TABLE II

| | Percent pickup | | | | |
|---|---|---|---|---|---|
| Polymer number | By weight of substrate | After extraction, by weight of substrate | Time to self-extinguish (secs.) | After glow (secs.) | Char length (inches) |
| II-5 | 90.3 | 86.5 | 0 | 0.5 | 3.95 |
|  | 63.2 | 60.9 | 0 | 0.4 | 6.20 |

The data summarized above clearly illustrates the effective and permanent fire retardant properties imparted to substrates by the novel polymers of this invention.

EXAMPLE V

This example further illustrates the excellent fire retardant properties provided by the novel polymers of this invention.

Emulsion polymer II-6 was utilized to saturate a sample of 180 grain/square yard dry-laid rayon non-woven material. The treated sample, which exhibited a pickup of 102%, by weight of the substrate, was then submitted to a vertical burn test equivalent to ASTM D777–46 described in Example IV, hereinabove. The results of the determination are presented in the following table:

| | Time to self-extinguish (seconds) | Char length (inches) |
|---|---|---|
| Treated sample | 0 | 3.6 |
| Laundered sample (one wash cycle) | 0 | 5.5 |

This data further illustrates the excellent and durable fire retardancy exhibited by substrates which have been treated with the novel copolymers of this invention.

Summarizing, it is seen that this invention provides for the preparation of novel fire retardant polymers. Variations may be made in procedures, proportions and materials without departing from the scope of this invention as defined by the following claims.

We claim:

1. A fire retardant polymer in aqueous emulsion form comprising moieties of (1) at least one brominated phosphate monomer corresponding to the formula

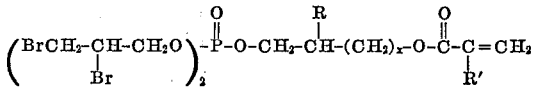

wherein
R is selected from the group consisting of hydrogen and chlorine atoms and methyl radicals;
$x$ is 0 when R=H, CH$_3$;
$x$ is 1 when R=Cl; and
R' is selected from the group consisting of hydrogen atoms and methyl radicals;
said brominated phosphate monomer having an acid number of less than about 3; and (2) at least one halogenated ethylenically unsaturated monomer, said brominated phosphate monomer present in a concentration of from about 10–95% and said halogenated ethylenically unsaturated monomer present in a concentration of from about 5–75%, the percentages being based on the total weight of the polymer.

2. The polymer of Claim 1, wherein said brominated phosphate monomer is selected from the group consisting of bis-dibromopropyl acryloxyethyl phosphate, bis-dibromopropyl acryloxypropyl phosphate, bis-dibromopropyl methacryloxyethyl phosphate, bis-dibromopropyl methacryloxypropyl phosphate, bis - (2,3-dibromopropyl)-3-acryloxy-2-chloropropyl phosphate and bis-(2,3-dibromopropyl)-3-methacryloxy-2-chloropropyl phosphate.

3. The polymer of Claim 1, wherein said halogenated ethylenically unsaturated monomer is selected from the group consisting of vinyl halides, vinylidene halides, halogenated styrene monomers, halogen-substitued alkyl esters of acrylic acid, halogen-substituted alkyl esters of methacrylic acid, mono-substituted halogenated alkyl esters of maleic acid and mono-substituted halogenated alkyl esters of fumaric acid.

4. The polymer of Claim 3, wherein said halogenated ethylenically unsaturated monomer is vinylidene chloride.

5. The polymer of Claim 1 which contains a maximum of 40%, by weight, of moieties of at least one other copolymerizable comonomer.

6. The polymer of Claim 5, wherein said copolymerizable comonomer is selected from the group consisting of alkyl esters of acrylic acid; alkyl esters of methacrylic acid; amides of acrylic acid; amides of methacrylic acid; N- alkanol-substituted amides of acrylic acid; N-alkanol-substituted amides of methacrylic acid; alpha, beta-unsaturated carboxylic acids; vinyl esters; vinyl ethers; vinyl nitriles; mono and dialkyl esters of maleic acid; and mono- and dialkyl esters of fumaric acid.

References Cited

UNITED STATES PATENTS 2,791,574   5/1957   Lanham _____ 260—89.5

FOREIGN PATENTS 877,905   3/1958   Great Britain _____ 260—86.1

STANFORD M. LEVIN, Primary Examiner

U.S. Cl. X.R.

260—29.6 T, 29.6 TA, 30.6 R, 78.5 E, 78.5 R, 80.71, 86.1 E, 86.3, Dig. 24; 117—136